Feb. 24, 1953 J. P. ECKERT, JR., ET AL 2,629,825
FLIP-FLOP CIRCUIT
Original Filed May 27, 1948
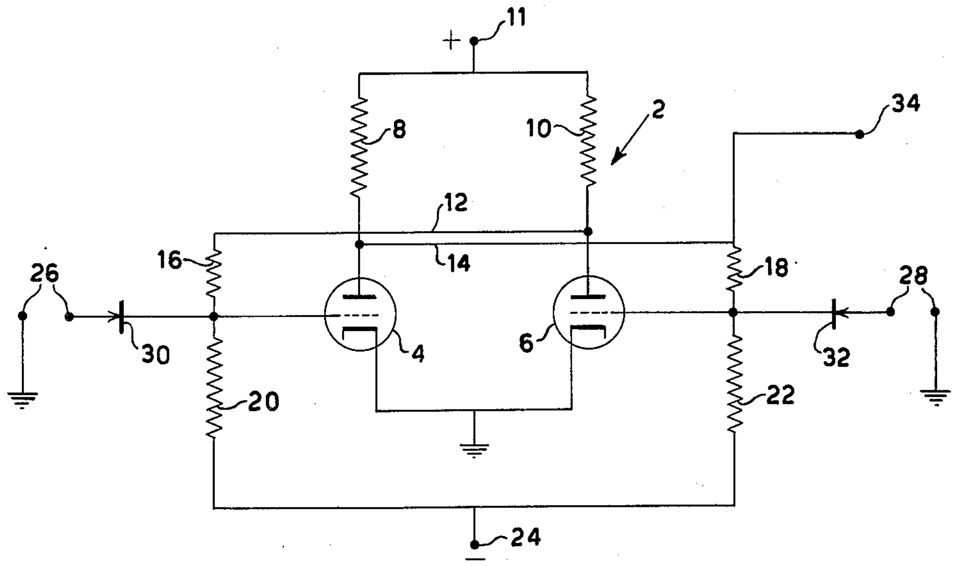
*INVENTORS.*
JOHN PRESPER ECKERT, JR. &
HERBERT FRAZER WELSH
BY
Busser & Harding
ATTORNEYS.

Patented Feb. 24, 1953 2,629,825

UNITED STATES PATENT OFFICE 2,629,825

FLIP-FLOP CIRCUIT

John Presper Eckert, Jr., and Herbert Frazer Welsh, Philadelphia, Pa., assignors to Eckert-Mauchly Computer Corporation, Philadelphia, Pa., a corporation of Pennsylvania Original application May 27, 1948, Serial No. 29,434. Divided and this application June 28, 1950, Serial No. 170,856

2 Claims. (Cl. 250—27)

This invention relates to flip-flop circuits and has particular reference to such a circuit which involves fast and positive flipping action.

This application is a division of application Serial No. 29,434, filed May 27, 1948.

It is sometimes desirable to have a flip-flop capable of extremely high speed transition. Generally the rapidity of the transition is detrimentally affected by the circuit from which the triggering input pulse is derived and, in fact, that circuit may be such as to render the triggering unreliable in the event that the triggering pulse is of very short duration.

It is the general object of the present invention to provide a flip-flop circuit which is capable of extremely rapid transition and has positive transition action. This object and other objects relating to details will become apparent from the following description read in conjunction with the accompanying drawing in which the figure is a wiring diagram showing a flip-flop provided in accordance with the invention.

The flip-flop indicated generally at 2 is of conventional type including the triodes 4 and 6 having their anodes connected through load resistances 8 and 10 to a source of potential which is positive with respect to that of the cathodes, assumed grounded and at zero potential. Criss-cross connections 12 and 14 connect the anodes of the triodes through resistances 16 and 18 to the respectively opposite grids. The grids are connected through resistances 20 and 22 to a negative potential source at 24.

The input terminals to the respective grids of triodes 4 and 6 are indicated at 26 and 28 and in accordance with the invention there are interposed between these terminals and the grids crystal diodes 30 and 32 which may be of the germanium crystal type. The arrowheads in these diodes indicate their cathodes while the orthoginal lines indicate their anodes.

Ordinarily a flip-flop circuit such as has been described comprises input terminals 26 and 28 connected directly to the grids with the result that the grids will take potentials corresponding to the potentials of whatever input circuits are connected to the terminals. This means that after a negative pulse is applied to a grid to effect tripping action the grid, immediately after the pulse has passed, will assume the potential of the source with the result that the tripping action may be slowed down or, in fact, may not be completed so as to result in misoperation.

In the case of the present arrangement the purpose of each diode is to allow the flip-flop, upon being pulsed through the crystal, to become "free": i. e., the diode permits a negative pulse to be delivered, for example, to the grid of triode 6, if that triode is conducting, from the source terminals 28 to initiate the flipping action; but once this has started the potential on this grid will not be restrained to assume the potential of the input terminal and it may become more negative than the potential of that terminal. This results in faster flipping and more positive action. While the diodes have been shown as connected to the grids of both triodes it will, of course, be evident that a crystal need be provided only in connection with that grid where it may be required for the purpose of securing fast and positive transition.

What is claimed is:

1. In combination, a first electric valve having control and output electrodes, a second electric valve having control and output electrodes, a coupling member linking a control electrode of said first valve with an output electrode of said second valve, a coupling member linking a control electrode of said second valve and an output electrode of said first valve, a first separate signal line connected with one of the electrodes of said first valve through a first unilateral conductor, and a second separate signal line connected with one of the electrodes of said second valve through a second unilateral conductor, whereby signals on one of the signal lines will have no effect on the other of the signal lines.

2. In combination, a first electric valve having control and output electrodes, a second electric valve having control and output electrodes, a coupling member linking a control electrode of said first valve with an output electrode of said second valve, a coupling member linking a control electrode of said second valve and an output electrode of said first valve, a first separate signal line connected with a control electrode of said first valve through a first unilateral conductor, and a second separate signal line connected with a control electrode of said second valve through a second unilateral conductor. whereby signals on one of the signal lines will have no effect on the other of the signal lines.

JOHN PRESPER ECKERT, JR.
HERBERT FRAZER WELSH.

REFERENCES CITED

The following references are of record in the file of this patent:

UNITED STATES PATENTS

| Number | Name | Date |
|---|---|---|
| 2,498,908 | Baldinger | Feb. 28, 1950 |

OTHER REFERENCES

"Digital Computer Switching Circuits," by G. H. Page, Electronics, September, 1948, pages 110–118.